(12) United States Patent
Ellis et al.

(10) Patent No.: US 11,993,893 B2
(45) Date of Patent: May 28, 2024

(54) INK FLUID SET FOR PRINTING ON TEXTILE

(71) Applicant: DUPONT ELECTRONICS, INC., Wilmington, DE (US)

(72) Inventors: Scott W. Ellis, Wilmington, DE (US); Xiaoqing Li, Newark, DE (US); Jue Liang, Glen Mills, PA (US)

(73) Assignee: DuPont Electronics, Inc., Wilmington, DE (US)

( * ) Notice: Subject to any disclaimer, the term of this patent is extended or adjusted under 35 U.S.C. 154(b) by 167 days.

(21) Appl. No.: 17/753,647

(22) PCT Filed: Sep. 18, 2020

(86) PCT No.: PCT/US2020/051423
§ 371 (c)(1),
(2) Date: Mar. 10, 2022

(87) PCT Pub. No.: WO2021/055700
PCT Pub. Date: Mar. 25, 2021

(65) Prior Publication Data
US 2022/0333301 A1  Oct. 20, 2022

Related U.S. Application Data

(60) Provisional application No. 62/903,233, filed on Sep. 20, 2019.

(51) Int. Cl.
| | | |
|---|---|---|
| *D06P 5/00* | (2006.01) | |
| *B41J 2/21* | (2006.01) | |
| *B41M 5/00* | (2006.01) | |
| *C09D 11/102* | (2014.01) | |
| *C09D 11/38* | (2014.01) | |
| *C09D 11/40* | (2014.01) | |
| *C09D 11/54* | (2014.01) | |
| *D06P 1/00* | (2006.01) | |
| *D06P 1/52* | (2006.01) | |
| *D06P 1/54* | (2006.01) | |
| *D06P 1/673* | (2006.01) | |
| *D06P 5/30* | (2006.01) | |
| *D06P 3/52* | (2006.01) | |

(52) U.S. Cl.
CPC ......... *D06P 5/30* (2013.01); *B41J 2/2114* (2013.01); *B41M 5/0011* (2013.01); *C09D 11/102* (2013.01); *C09D 11/38* (2013.01); *C09D 11/40* (2013.01); *C09D 11/54* (2013.01); *D06P 1/002* (2013.01); *D06P 1/5285* (2013.01); *D06P 1/54* (2013.01); *D06P 1/6735* (2013.01); *D06P 5/002* (2013.01); *D06P 3/52* (2013.01)

(58) Field of Classification Search
CPC .......... D06P 5/30; D06P 1/002; D06P 1/5285; D06P 1/54; D06P 1/6735; D06P 5/002; D06P 3/52; D06P 1/44; D06P 1/5221; D06P 1/5228; D06P 1/5257; D06P 1/647; D06P 1/653; D06P 1/6533; D06P 1/67316; D06P 1/67341; D06P 1/67358; D06P 1/67375; B41J 2/2114; B41M 5/0011; C09D 11/102; C09D 11/38; C09D 11/40; C09D 11/54; C09D 11/10
USPC ...................................................... 106/31.13
See application file for complete search history.

(56) References Cited

U.S. PATENT DOCUMENTS

| | | | |
|---|---|---|---|
| 4,597,794 A | 7/1986 | Ohta et al. | |
| 5,085,698 A | 2/1992 | Ma et al. | |
| 5,231,131 A | 7/1993 | Chu et al. | |
| 6,117,921 A | 9/2000 | Ma et al. | |
| 6,262,152 B1 | 7/2001 | Fryd et al. | |
| 6,306,994 B1 | 10/2001 | Donald et al. | |
| 6,433,117 B1 | 8/2002 | Ma et al. | |
| 6,666,553 B2* | 12/2003 | Han-Adebekun | C09D 11/322 347/100 |
| 9,090,734 B2 | 7/2015 | Kraiter et al. | |
| 9,255,207 B2 | 2/2016 | Berge et al. | |
| 2003/0160851 A1 | 8/2003 | Baccay et al. | |
| 2007/0103529 A1 | 5/2007 | Pearl et al. | |
| 2012/0064134 A1* | 3/2012 | Bourke, Jr. | G02B 5/008 106/287.18 |
| 2013/0258011 A1* | 10/2013 | Boris | C09D 11/38 524/561 |
| 2017/0008273 A1* | 1/2017 | Kuwabara | B41J 11/0015 |
| 2019/0257030 A1 | 8/2019 | Chen et al. | |

FOREIGN PATENT DOCUMENTS

| | | | | |
|---|---|---|---|---|
| EP | 0556649 B1 | 6/1999 | | |
| EP | 2059634 B1 | 2/2016 | | |
| EP | 3115209 A2 | 1/2017 | | |
| JP | 2017132946 A | 1/2016 | | |
| JP | 2017132946 A | 8/2017 | | |
| JP | 2019038191 A | 3/2019 | | |
| WO | 2008/033569 A2 | 3/2008 | | |
| WO | WO 2017091356 A1 * | 6/2017 | ............ | B41J 2/185 |
| WO | WO 2020005253 A1 * | 1/2020 | ............ | D06P 1/6735 |

OTHER PUBLICATIONS

The Pigment Handbook, vol. 1, 2nd Ed., John Wiley & Sons, NY, 1988.

(Continued)

*Primary Examiner* — Eisa B Elhilo

(57) ABSTRACT

The present disclosure provides an ink fluid set containing an aqueous pre-treatment composition, a clear ink, and colored aqueous inkjet inks. This ink fluid set is particularly suitable for printing on polyester, cotton, and blends of cotton and synthetic textiles.

18 Claims, No Drawings

(56) References Cited

OTHER PUBLICATIONS

PCT International Search Report for Application No. PCT/US2020/051423; Haider, Ursula, Authorized Officer; ISA/EPO; dated Nov. 16, 2020.

* cited by examiner

INK FLUID SET FOR PRINTING ON TEXTILE

CROSS REFERENCE TO RELATED APPLICATIONS

This application claims priority under 35 U.S.C. § 119 from U.S. Provisional Application Ser. No. 62/903,233, filed Sep. 20, 2019.

BACKGROUND OF THE DISCLOSURE

This disclosure pertains to an ink fluid set containing an aqueous pre-treatment composition, a clear ink, and aqueous colored inkjet inks. This ink fluid set is particularly suitable for printing on textile substrate.

Inkjet printing is a non-impact digital printing process in which droplets of ink are deposited on a substrate, such as paper, to form the desired image. Inkjet printers are equipped with an ink set which, for full color printing, typically comprises a cyan, magenta and yellow ink (CMY). An ink set also typically comprises a black ink (CMYK) with the black ink being the most common ink.

Inkjet printing are becoming increasingly important for markets other than conventional desktop printing for small office/home office. Digital printing methods have gained popularity in printing of textiles, and offer a number of potential benefits over conventional printing methods such as screen printing. Inkjet digital printing eliminates the setup expense associated with screen preparation and can potentially enable cost effective short run production. Inkjet printing furthermore allows visual effects such as tonal gradients and infinite pattern repeat sizes that cannot be practically achieved with a screen printing process.

However, aqueous pigmented inkjet ink is traditionally not suited to print on synthetic fabrics based on synthetic resin including polyester, polypropylene, polyurethane, nylon, Nomax®, and Kevlar® due to limited ink absorbency and surface hydrophobicity of the synthetic fibrous material. The lack of adhesion to the hydrophobic fibers makes the pigmented inkjet-printed fabrics susceptible to color removal by abrasion and washing. It is known in the art, such as the methods disclosed in EP2059634B1, to apply a fabric pre-treatment followed by a white ink base layer before printing colored inks, to achieve improved washfastness. However, polymer present in the pre-treatment solution necessary for washfastness not only leaves stain, but also causes the fabric to loss its elasticity, stretchiness and soft hand-feel. Even more challenging is to print on a color dyed synthetic fabric, especially polyester colored by disperse dye. Migration of the disperse dye on the fabric to the white ink layer during high temperature curing of the white and color inks often results in discoloring of the white ink layer and poor image quality.

US Patent Application Publication No. 20070103529 discloses a printing method using a property-sensitive inkjet composition having a property-sensitive agent that precipitates upon contacting a wetting composition. However, this approach suffers from the problem of having a wetting composition jetted near ink print heads that will eventually destabilize ink near the nozzles causing print head failure.

JP2017132946 discloses a textile printing inkjet ink set where an inkjet textile printing recording method is employed having: a step of applying to fabric a pre-treatment liquid containing water and a reactive agent that aggregates the constituents of a colored ink composition; and a step of forming an image by applying the colored ink composition and a clear ink composition, in a mutually wetted condition, to the fabric to which the pre-treatment liquid was applied. However, this ink set requires its colored ink composition to include a resin to react with the reactive agent in the pre-treatment, and its clear ink composition to include a resin that does not react with the reactive agent in the pre-treatment.

A need exists for achieving a higher color, durability, and retaining elasticity on the fabric especially colored textiles. The present disclosure satisfies this need by providing an ink fluid set containing a pre-treatment composition, and a clear ink functioning as an adhesive and dye blocking layer for colored inks, so as to achieve higher printing quality and durability without increasing stiffness of the printed fabric.

SUMMARY OF THE DISCLOSURE

An embodiment provides an inkjet printing method for printing on a textile substrate comprising steps in the order of:
a) providing the substrate;
b) applying a pre-treatment composition comprising a salt of a multivalent cation and/or an acid;
c) applying by jetting a clear ink comprising a polymeric binder;
d) applying by jetting a white ink; and
e) applying by jetting non-white colored inks.

Another embodiment provides that the multivalent cation is selected from one or more of the group of multivalent cations of elements Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn and Pb.

Another embodiment provides that the acid is selected from the group consisting of polyacrylic acid, acetic acid, glycolic acid, malonic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these acid, and mixtures thereof.

Another embodiment provides that the acid is selected from the group consisting of polyacrylic acid, acetic acid, and mixture thereof.

Another embodiment provides that the polymeric binder is selected from the group consisting of polyurethane, acrylic, styrene acrylics, styrene butadienes, styrene butadiene acrylonitriles, neoprenes, ethylene (meth)acrylic acids, ethylene vinyl acetate emulsions, latexes, and mixtures thereof.

Another embodiment provides that the polymeric binder is selected from the group consisting of polyurethane, acrylic, styrene acrylics, ethylene vinyl acetate emulsions, and mixtures thereof.

Another embodiment provides that the clear ink further comprising a latent crosslinker which chemically reacts with said polymer upon heat treatment.

Another embodiment provides that the pre-treatment composition causes said polymer binder to aggregate or precipitate.

Another embodiment provides that the time interval between the printing of the white ink and printing of the clear ink is less than 10 minutes.

Another embodiment provides that the time interval between the printing of the white ink and printing of the clear ink is less than 1 minute.

Another embodiment provides that the time interval between the printing of the colored inks and printing of the white ink is less than 10 minutes.

Another embodiment provides that the time interval between the printing of the colored inks and printing of the white ink is less than 1 minute.

Another embodiment provides that the textile substrate is a non-white colored textile.

Another embodiment provides an inkjet printing fluid set comprising:
a) a pre-treatment composition comprising a salt of a multivalent cation and/or an acid;
b) a clear ink comprising a polymeric binder;
c) a white ink; and
d) non-white colored inks.

Yet another embodiment provides an inkjet printing fluid set consisting of:
a) a pre-treatment composition comprising a salt of a multivalent cation and/or an acid;
b) a clear ink comprising a polymeric binder; and
c) non-white colored inks.

These and other features and advantages of the present embodiments will be more readily understood by those of ordinary skill in the art from a reading of the following detailed description. Certain features of the disclosed embodiments which are, for clarity, described above and below as separate embodiments, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "dispersion" means a two-phase system wherein one phase consists of finely divided particles (often in a colloidal size range) distributed throughout a bulk substance, the particles being the dispersed or internal phase and the bulk substance being the continuous or external phase.

As used herein, the term "dispersant" means a surface active agent added to a suspending medium to promote uniform and maximum separation of extremely fine solid particles often of colloidal sizes. For pigments, the dispersants are most often polymeric dispersants, and the dispersants and pigments are usually combined using a dispersing equipment.

As used herein, the term "aqueous vehicle" refers to water or a mixture of water and at least one water-soluble, or partially water-soluble (i.e., methyl ethyl ketone), organic solvent (co-solvent).

As used herein, the term "substantially" means being of considerable degree, almost all.

As used herein, the term "dyne/cm" means dyne per centimetre, a surface tension unit.

As used herein, the term "cP" means centipoise, a viscosity unit.

The materials, methods, and examples herein are illustrative only except as explicitly stated, and are not intended to be limiting.

In addition, references in the singular may also include the plural (for example, "a" and "an" may refer to one, or one or more) unless the context specifically states otherwise.

Pre-Treatment Composition

The pre-treatment composition contains an ink-aggregating agent that "precipitates" or "crashes" with a colorant or other ingredient(s) in an ink. The pre-treatment fluid should comprise sufficient ink-aggregating agent to provide adequate fixation of the colored inkjet inks. Typically, the pre-treatment will comprise at least about 0.5 wt % of the ink-aggregating agent, and amounts can be used up to the solubility limits of the particularly ink-aggregating agent utilized. Preferably, the pre-treatment composition will comprise from about 1 wt % to about 20 wt % of the ink-aggregating agent. Some suitable ink-aggregating agents include multivalent metal salts, and organic acids.

"Multivalent" indicates an oxidation state of two or more and, for an element "Z", are typically described as $Z^{2+}$, $Z^{3+}$, $Z^{4+}$ and so forth. For brevity, multivalent cations may be referred to herein as W. The multivalent cations are substantially soluble in the aqueous pre-treatment solution and preferably exist (in solution) in a substantially ionized state so that they are in a form where they are free and available to interact with textile when the textile is exposed to the pre-treatment solution.

$Z^x$ includes, but is not limited to multivalent cations of the following elements: Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn, Pb. In another embodiment, the multivalent cation comprises at least one of Ca, Mg, Ba, Ru, Co, Zn and Ga. In yet another embodiment, the multivalent cation comprises at least one of Ca, Mg, Ba, Ru, Co, Zn and Ga. Preferably the multivalent cation is Ca, Mg, and Zn.

$Z^x$ can be incorporated into pre-treatment solution by addition in a salt form or by addition in an alkaline form and used as a base in the adjustment of the pre-treatment solution pH.

The associated anionic material can be chosen from any common anionic material, especially halides, nitrates and sulfates. The anionic form is chosen so that the multivalent cation is soluble in the aqueous pre-treatment solution. The multivalent cationic salts can be used in their hydrated form. One or more multivalent cationic salts may be used in the pre-treatment solution.

For Ca, the preferred multivalent cation salts are calcium chloride, calcium nitrate, calcium nitrate hydrate and mixtures thereof.

An organic acid as aggregating agent precipitates ink drops by lowering the ink's pH and coagulating pigment dispersion and other ink components. Specific examples of acids are polyacrylic acid, acetic acid, glycolic acid, malonic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid and derivatives of these compounds. Polyacrylic acid and acetic acid are particularly preferred.

The pre-treatment composition can further comprise a surfactant to provide wetting on film substrate. Some suitable surfactants include surfactants that are miscible with ink-aggregating agent. Some useful surfactants include cationic, non-ionic, and amphoteric surfactants. Some suitable cationic surfactants include, for example, quaternized ammonium or pyridinium surfactants, such as dodecyltrimethylammonium chloride, cetyltrimethylammonium bromide, cetyltrimethylpyridinium chloride and others. Some suitable non-ionic surfactants include ethoxylated acetylene diols (e.g. Surfynol® series from Evonik), ethoxylated primary alcohols (e.g. Neodol® series from Shell) and secondary alcohols (e.g. Tergitol® series from Dow Chemical), Pluronic® block copolymer surfactants, sulfosuccinates (e.g. Aerosol® series from Cytec), organosilicones (e.g. Dynol™ series from Evonik) and fluoro surfactants (e.g. Zonyl® series from Chemours). Amphoteric surfactants that, within a certain pH range, are cationic may also be used. In this case the pH of the liquid composition must be adjusted below the isoelectric point of the surfactant. Some examples of useful zwitterionic surfactants include N,N-dimethyl-N-tetradecyl amine oxide (NTAO), N,N-dimethyl N-hexadecyl amine oxide (NHAO) and related amine oxide compounds. Another example is N-dodecyl-N,N-dimethyl glycine. Yet other examples include phosphates, phosphites, phosphonates, lecithins and the like, and phosphonate esters such as phosphomyelin. Surfactants may be used, typically in the amount of about 0.1 to about 10% and more typically about 0.5 to about 5%, based on the total weight of the pre-treatment fluid.

Other optional ingredients in the pre-treatment solution may include, but are not limited to, humectants and biocides. Biocides prevent microbial degradation—their selection and use are generally well known in the art.

Application of the pre-treatment to the fabric can be any convenient method, such methods also being generally well known to those of ordinary skill in the relevant art. One example of a preferred pre-treatment application method is referred to as padding. In padding, a fabric is dipped in the pre-treatment solution, then the saturated fabric is passed through nip rollers that squeeze out the excess solution. The amount of solution retained in the fabric can be regulated by the nip pressure applied by the rollers. Other pre-treatment techniques include spray application where the solution is applied by spraying on the face or face and back of the fabric, and jetting application where the solution is jetted from an inkjet printhead.

Colored Ink

A colored ink according to the embodiments refers to an ink comprising a colorant. A colored ink can include a white ink. When a white ink is to be excluded from the colored ink(s), the term "non-white colored ink(s)" is used.

Colorants

The colorant used for printing the colored image may be a dye or a pigment. Dyes include disperse dyes, reactive dyes, acid dyes and the like. The term "pigment" as used herein means an insoluble colorant that requires to be dispersed with a dispersant and processed under dispersive conditions in the presence of a dispersant. The pigment also includes dispersed dyes. Pigmented inks are preferred.

Pigments suitable for being used are those generally well-known in the art for aqueous inkjet inks. The selected pigment(s) may be used in dry or wet form. For example, pigments are usually manufactured in aqueous media, and the resulting pigments are obtained as a water-wet presscake. In presscake form, the pigment does not agglomerate to the extent it would in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include, but not limited to: cyan pigments from Pigment Blue 15:3 and Pigment Blue 15:4; magenta pigments from Pigment Red 122 and Pigment Red 202; yellow pigments from Pigment Yellow 14, Pigment Yellow 74, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 254, Pigment Red 184, Pigment Red 264 and Pigment Red PV19; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; and black pigment carbon black. The pigment names and abbreviations used herein are the "C.I." designation for pigments established by Society of Dyers and Colourists, Bradford, Yorkshire, UK and published in The Color Index, Third Edition, 1971.

Examples of white color materials include, but are not limited to, white inorganic pigments such as Titanium Oxide, Zinc Oxide, zinc sulfide, antimony oxide, and zirconium oxide. Besides such white inorganic pigments, white organic pigments such as white hollow resin particles and polymeric particles can also be used. The preferred pigment for the aqueous pigmented white ink is titanium dioxide. Titanium dioxide (TiO2) pigment useful may be in the rutile or anatase crystalline form. It is commonly made by either a chloride process or a sulfate process. In the chloride process, TiCl4 is oxidized to TiO2 particles. In the sulfate process, sulfuric acid and ore containing titanium are dissolved, and the resulting solution goes through a series of steps to yield TiO2. Both the sulfate and chloride processes are described in greater detail in "The Pigment Handbook", Vol. 1, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the ink. For applications demanding high hiding or decorative printing applications, the titanium dioxide particles preferably have an average size of less than about 1 micron (1000 nanometers). Preferably, the particles have an average size of from about 50 to about 950 nanometers, more preferably from about 75 to about 750 nanometers, and still more preferably from about 100 to about 500 nanometers. These titanium dioxide particles are commonly called pigmentary TiO2.

For applications demanding white color with some degree of transparency, the pigment preference is "nano" titanium dioxide. "Nano" titanium dioxide particles typically have an average size ranging from about 10 to about 200 nanometers, preferably from about 20 to about 150 nanometers, and more preferably from about 35 to about 75 nanometers. An ink comprising nano titanium dioxide can provide improved chroma and transparency, while still retaining good resistance to light fade and appropriate hue angle. A commercially available example of an uncoated nano grade of titanium oxide is P-25, available from Evonik (Parsippany N.J.).

The titanium dioxide pigment may be substantially pure titanium dioxide or may contain other metal oxides, such as silica, alumina and zirconia. Other metal oxides may become incorporated into the pigment particles, for example, by co-oxidizing or co-precipitating titanium compounds with other metal compounds. If co-oxidized or co-precipitated metals are present, they are preferably present as the metal oxide in an amount from about 0.1 wt % to about 20 wt %, more preferably from about 0.5 wt % to about 5 wt %, and still more preferably from about 0.5 wt % to about 1.5 wt %, based on the total titanium dioxide pigment weight.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. Such coatings may optionally be present in an amount of from about 0.1 wt % to about 10 wt %, and preferably from about 0.5 wt % to about 3 wt %, based on the total weight of the titanium dioxide pigment. These coatings can provide improved properties including reducing the photoreactivity of the titanium dioxide. Commercial examples of such coated titanium dioxides include R700 (alumina-coated, available from Chemours, Wilmington Del.), RDI-S (alumina-coated, available from Kemira Industrial Chemicals, Helsinki, Finland), R706 (available from Chemours, Wilmington Del.) and W-6042 (a silica alumina treated nano grade titanium dioxide from Tayco Corporation, Osaka Japan).

The titanium dioxide pigment may also bear one or more organic surface coatings, such as, for example, carboxylic acids, silanes, siloxanes and hydrocarbon waxes, and their reaction products with the titanium dioxide surface. The amount of organic surface coating, when present, generally ranges from about 0.01 wt % to about 6 wt %, preferably from about 0.1 wt % to about 3 wt %, more preferably about 0.5 wt % to about 1.5 wt %, and still more preferably about 1 wt %, based on the total weight of the pigment.

Polymeric Dispersant, for Colorant

The polymeric dispersant for colorant may be a random or a structured polymer. Typically, the polymer dispersant is a copolymer of hydrophobic and hydrophilic monomers. The "random polymer" means polymers where molecules of each monomer are randomly arranged in the polymer backbone. For a reference on suitable random polymeric dispersants, see: U.S. Pat. No. 4,597,794. The "structured polymer" means polymers having a block, branched, graft or star structure. Examples of structured polymers include AB or BAB block copolymers such as the ones disclosed in U.S. Pat. No. 5,085,698; ABC block copolymers such as the ones disclosed in EP Patent Specification No. 0556649; and graft polymers such as the ones disclosed in U.S. Pat. No. 5,231,131. Other polymeric dispersants that can be used are described, for example, in U.S. Pat. Nos. 6,117,921, 6,262, 152, 6,306,994 and 6,433,117.

The "random polymer" also includes polyurethanes. Particularly useful are the polyurethane dispersant disclosed in U.S. Patent Application Publication No. 2012/0214939 where the polyurethane dispersant is crosslinked after dispersing a pigment to form a pigment dispersion.

Other "random polymer" suitable for dispersing disperse dye is not particularly limited, examples include formaldehyde condensates of creosote oil sulfonic acid, formaldehyde condensates of aromatic sulfonic acids, formaldehyde condensates of lignin sulfonic acid, and their sodium salts and the like, and styrene-(meth)acrylic acid-based copolymer, and polyurethane dispersants.

Preparation of Colorant Dispersions

The colorant dispersions used in this invention can be prepared using any conventional milling process known in the art. Most milling processes use a two-step process involving a first mixing step followed by a second grinding step. The first step comprises mixing of all the ingredients, that is, colorants, dispersants, liquid carriers, neutralizing agent and any optional additives to provide a blended "premix". Typically, all liquid ingredients are added first, followed by the dispersants, and lastly the colorant. Mixing is generally done in a stirred mixing vessel, and a high-speed disperser (HSD) is particularly suitable for the mixing step. A Cowels type blade attached to the HSD and operated at from 500 rpm to 4000 rpm, and more typically from 2000 rpm to 3500 rpm, provides optimal shear to achieve the desired mixing. Adequate mixing is usually achieved after mixing under the conditions described above for a period of from 15 to 120 minutes.

The second step comprises grinding of the premix to produce a colorant dispersion. Typically, grinding involves a media milling process, although other milling techniques can also be used. In the present invention, a lab-scale Eiger Minimill (Model M250, VSE EXP) manufactured by Eiger Machinery Inc., Chicago, Illinois is employed. Grinding was accomplished by charging about 820 grams of 0.5 YTZ® zirconia media to the mill. The mill disk is operated at a speed between 2000 rpm and 4000 rpm, and typically between 3000 rpm and 3500 rpm. The dispersion is processed using a re-circulation grinding process with a typical flow rate through the mill at between 200 to 500 grams/minute, and more typically at 300 grams/minute. The milling may be done using a staged procedure in which a fraction of the solvent is held out of the grind and added after milling is completed. This is done to achieve optimal rheology that maximizes grinding efficiency. The amount of solvent held out during milling varies by dispersion, and is typically between 200 to 400 grams for a batch size with a total of 800 grams. Typically, the dispersions of the present invention are subjected to a total of 4 hours of milling.

For black pigment dispersions, an alternate milling process using a Microfluidizer can be used. Microfluidization is a non-media milling process in which milling is done by pigment impingement through nozzles under high pressures. Typically, pigment dispersions are processed at 15,000 psi with a flow rate of 400 grams/minute for a total of 12 passes through the mill. In making the black pigment dispersions in the Examples, a lab-scale (Model M-110Y, available from Microfluidics of Newton, Massachusetts) high pressure pneumatic Microfluidizer with a diamond Z Chamber was employed.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

The range of useful particle size of the above colorant dispersion is typically from about 0.005 um to about 15 um. Typically, the particle size should range from about 0.005 um to about 5 um; and, specifically, from about 0.005 um to about 1 um. The average particle size as measured by dynamic light scattering is less than about 500 nm, typically less than about 300 nm.

White Pigment Dispersion

One or more dispersants described for colored pigment are employed to stabilize the titanium dioxide. It is generally desirable to make the stabilized TiO2 pigment in concentrated slurry form. TiO2 slurry is generally done in a stirred mixing vessel, and a high-speed disperser (HSD) is particularly suitable for the mixing step. A Cowels type blade attached to the HSD and operated at from 500 rpm to 4000 rpm, and more typically from 2000 rpm to 3500 rpm, provides optimal shear to achieve the desired mixing. Adequate mixing is usually achieved after mixing under the conditions described above for a period of from 15 to 600 minutes. The amount of titanium dioxide present in the slurry composition is preferably from about 35 wt % to about 80 wt %, based on the total slurry weight, more preferably from about 50 wt % to about 75 wt %, based on the total weight of the slurry. The titanium dioxide has a 50% average particle size (hereinafter referred to as "D50") that is preferably in the range of 50 to 500 nm, more preferably in the range of 150 to 350 nm. The titanium dioxide having a D50 within these ranges enables printed film to exhibit satisfactory opacity of the image, which enables formation of an image with high quality.

In the case of color pigments, the ink may contain up to approximately 30%, preferably about 0.1 to about 25%, and more preferably about 0.25 to about 10%, pigment by weight based on the total ink weight. If an inorganic pigment such as TiO2 pigment is selected, the ink will tend to contain higher weight percentages of pigment than with comparable inks employing color pigment, and may be as high as about 75% in some cases, since inorganic pigments generally have higher specific gravities than organic pigments.

Post Dispersing Modification of a Polymeric Dispersant after Formation of a Pigment Dispersion The polymeric dispersant dispersing a pigment may be crosslinked after a pigment dispersion is prepared to form a crosslinked pigment dispersion prior to its inclusion in an inkjet ink.

To enable crosslinking, a polymeric dispersant is substituted with crosslinkable moieties which are selected from the group consisting of acetoacetoxy, acid, amine, epoxy, hydroxyl, blocked isocyanates and mixtures thereof. Upon introduction of a crosslinking agent to a pigment dispersion, crosslinking of the polymeric dispersant occurs to form a crosslinked pigment dispersion. Typically, a crosslinking agent is selected from a group consisting of acetoacetoxy, acid, amine, anhydride, epoxy, hydroxyl, isocyanates, blocked isocyanates and mixtures thereof. After crosslinking of a pigment dispersion, any excess polymeric dispersant can be removed by purification processes such as ultrafiltration.

Specific examples of crosslinking moiety/agent pairs are hydroxyl/isocyanate and acid/epoxy.

Polymeric Binder, for Colored Inks

A binder is a polymeric compound or a mixture of polymeric compounds that is added to an ink formulation. The binder can impart properties to the printed material that, for example, gives greater durability to the printed material. Typical polymers used as binders in inkjet inks include polyurethane dispersions and polyurethane solutions, acrylics, styrene acrylics, styrene butadienes, styrene butadiene acrylonitriles, neoprenes, ethylene (meth)acrylic acids, ethylene vinyl acetate emulsions, latexes and the like. The binder may be a solution or stabilized as an emulsion by having ionic substituents such as carboxylic acids, sulfur containing acids, amine groups, and other similar ionic groups. Alternatively, the binder may be stabilized by external surfactants. The binder can be used singly or in combination with other binders. The binder is typically present in an ink in an amount of at least 0.2% by weight based on the total weight of the ink. Typically, a binder is different from dye and pigment dispersant described above. The binder is typically added to an ink during the final formulation stage, not during the preparation of a pigment dispersion.

The binder can be used singly or in combination with other binders. Typically, the binder is a polyurethane. An optional polyurethane binder is one that is partially, e.g. less than 50% soluble in THF, as disclosed in U.S. Pat. No. 9,255,207, to enhance the durability of the printed image of an inkjet ink. The disclosure of U.S. Pat. No. 9,255,207 is incorporated by reference herewith for all purposes as if fully set forth.

The binder is typically present in an ink in an amount of at least 0.2% by weight based on the total weight of the ink. The amount can be from 1 to 15 weight percent.

Aqueous Vehicle for Colored Ink

Selection of a suitable aqueous vehicle mixture depends on requirements of the specific application, such as the desired surface tension and viscosity, the selected colorant, drying time of the ink, and the type of substrate onto which the ink will be printed. Representative examples of water-soluble organic solvents which may be utilized in the present disclosure are those that are disclosed in U.S. Pat. No. 5,085,698.

If a mixture of water and a water-soluble solvent is used, the aqueous vehicle typically will contain about 30% to about 95% of water with the remaining balance (i.e., about 70% to about 5%) being the water-soluble solvent. Compositions of the present disclosure may contain about 60% to about 95% water, based on the total weight of the aqueous vehicle.

The amount of aqueous vehicle in the ink is typically in the range of about 70% to about 99.8%; more typically, about 80% to about 99.8%, based on total weight of the ink.

Surfactants may be used, typically in an amount of from about 0.01% to about 5%, and specifically from about 0.2% to about 2%, based on the total weight of the ink.

Colored Ink Properties

Jet velocity, separation length of the droplets, drop size and stream stability are greatly affected by the surface tension and the viscosity of the ink. Inkjet inks suitable for use with inkjet printing systems should have a surface tension in the range of about 20 dyne/cm to about 70 dyne/cm, more preferably about 25 to about 40 dyne/cm at 25° C. Viscosity is preferably in the range of about 1 cP to about 30 cP, more preferably about 2 to about 20 cP at 25° C. The ink has physical properties compatible with a wide range of ejecting conditions, i.e., driving frequency of the pen and the shape and size of the nozzle.

The inks should have excellent storage stability for long periods. Preferably, the instant inks can sustain elevated temperature in a closed container for extended periods (e.g. 70° C. for 7 days) without substantial increase in viscosity or particle size.

Further, the ink should not corrode parts of the inkjet printing device it comes in contact with, and it should be essentially odorless and non-toxic.

Inks of the instant invention can achieve the beneficial durable properties of washfastness.

Other Ink Additives

Other ingredients, additives, may be formulated into the inkjet ink, to the extent that such other ingredients do not interfere with the stability and jettability of the inkjet ink. This may be readily determined by routine experimentation by one skilled in the art.

Surfactants are commonly added to inks to adjust surface tension and wetting properties. Suitable surfactants include the ones disclosed in the Vehicle section above. Surfactants are typically used in amounts up to about 3% and more typically in amounts up to 1% by weight, based on the total weight of the ink.

Inclusion of sequestering (or chelating) agents such as ethylenediaminetetraacetic acid, iminodiacetic acid, ethylenediamine-di(o-hydroxyphenylacetic acid), nitrilotriacetic acid, dihydroxyethylglycine, trans-1,2-cyclohexanediaminetetraacetic acid, diethylenetriamine-N,N,N',N'',N''-pentaacetic acid, and glycoletherdiamine-N,N,N',N'-tetraacetic acid, and salts thereof, may be advantageous, for example, to eliminate deleterious effects of heavy metal impurities.

Clear Ink Composition

Clear ink in the embodiment is an inkjet ink which comprises a polymeric resin acting as a binder and doesn't contain any colorant, either pigment or dye. The terms "polymeric resin" and "polymeric binder" may be used interchangeably as a component for the clear ink in the present disclosure. The clear ink can be clear, translucent or slightly white in color. The polymeric resin can be used singly or in combination with other polymers. The polymeric resin is typically present in an ink in an amount of at least 0.5% by weight based on the total weight of the ink. The amount can be from 1 to 30 weight percent; preferably, from 3 to 25% percent; most preferably, from 5% to 20%. Other components of the clear ink include aqueous vehicle and additional additives such as water, water-soluble organic solvents, surfactant, pH adjuster, and biocide are in the same scope as described for the colored ink composition. Ink properties are set in the same range as well.

The polymeric resin contains water dispersible particles with D50 particle size ranging from 10 nm to 200 nm. Preferably, the polymer resin aggregates upon interacting with the pre-treatment. A screening test to determine whether the polymeric resin aggregates with the pre-treatment is to mix a 10 wt % polymer (on a dry basis) and a 15 wt % of calcium nitrate tetrahydrate and observe whether the solution/emulsion is stable. The stability is observed at ambient temperature (~25° C.), at 24 hours after mixing. The clear ink polymer resin must lead to precipitate in the above mixture. The polymeric resin can be the same or different from the polymeric binder in the colored ink(s).

Typical polymeric resin includes polyurethane dispersions, acrylic, styrene acrylics, styrene butadienes, styrene butadiene acrylonitriles, neoprenes, ethylene (Meth)acrylic acids, ethylene vinyl acetate emulsions, latexes and the like. The polymer is typically stabilized as an emulsion particle by having ionic substituents such as carboxylic acids, sulfur containing acids, amine groups, and other similar ionic groups. Alternatively, the polymer may be stabilized by external surfactants. Means of stabilization of the resin particle is not limited to any particular one as long as the polymer forms aggregates with pre-treatment upon mixing. Examples of polyurethane dispersions are disclosed in U.S. Pat. No. 9,090,734, which is incorporated by reference herein, as if fully set forth. Commercially available polyurethane resins include, but not limit to, Mitsui Chemical (Tokyo, Japan)'s Takelac™ W-6110, W-6061T, W-5661, WS-6021, W-5030 and WS-4022. Example of acrylic and styrene acrylic resin include, but not limit to, Japan Coating Resin Corp. (Osaka, Japan)'s Mowinyl 6760, 6750, 6770, 6960, 6963 and 977A. Typically, the polymer is a polyurethane. The polymer is typically present in an ink in an amount of at least 3% by weight based on the total weight of the ink.

A clear ink can also contain a latent crosslinker which chemically reacts with polymer, ink solvents, fabric, white and color inks upon heat treatment of the printed article. There is no chemical reaction taking place before the clear ink is printed and the printed article is heated. Latent crosslinker include, but not limited to, blocked isocyanate, epoxy, polycarbodiimide, and oxazoline-functional polymer. Typically, the latent crosslinker is a blocked isocyanate. Example of blocked isocyanate are Imprafix® 2794, Baybond®XL 7270 and Baybond® XL 3674XP manufactured by Covestro (Leverkusen, Germany). The amount of the crosslinker can be from 0.1 to 10 weight percent; preferably, from 0.3 to 7% percent; most preferably, from 0.5% to 5%.

Inkjet Ink Sets

The term "ink set" refers to all the individual inks or other fluids an inkjet printer is equipped to jet. The clear ink and white ink used to print prior to printing the colored inks are considered part of an ink set. This ink set, together with the pre-treatment composition, forms an inkjet printing fluid set.

In one preferred embodiment, the ink set comprises two differently colored inkjet inks, at least one of which is a white pigmented inkjet ink as described above, and one of which is a clear ink as described above.

In another preferred embodiment, the ink set comprises at least three differently colored inkjet inks, wherein at least one is a cyan inkjet ink, at least one is a magenta inkjet ink, and at least one is a yellow inkjet ink.

In addition to the colored inkjet inks just mentioned, it is also preferable to include a black inkjet ink in the ink set.

In addition to the CMYKW and clear inks mentioned above, the ink sets may contain additional differently colored inks, as well as different strength versions of the CMYKW and other inks.

For example, the ink set of the present invention can comprise full-strength versions of one or more of the inks in the ink set, as well as "light" versions thereof.

Additional colors for the inkjet ink set include, for example, orange, violet, green, red and/or blue.

The preferred ink sets inks are pigmented inks.

Substrate A particularly preferred use of the inks and ink sets of the present invention is in the inkjet printing of textiles. Textiles include but are not limited to cotton, wool, silk, nylon, polyester and the like, and blends thereof. The finished form of the textile includes, but is not limited to, fabrics, garments, t-shirts, furnishings such as carpets and upholstery fabrics, and the like. Additionally, fibrous textile materials that come into consideration include but not limited to natural fibrous materials such as cotton, wool and silk, and regenerated fibrous materials such as viscose and lyocell. Further fibrous materials include fibers based on synthetic resin including polyester, polypropylene, polyurethane, nylon, Nomax®, and Kevlar®. These types of fabric are commonly pretreated prior to printing. The said fibrous materials are preferably in the form of sheet-form textile woven fabrics, knitted fabrics or webs. The present embodiments are particularly advantageous for ink-jet printing on non-white textile made from synthetic fibrous material and their blends with cotton.

Printing Method

The present method relates to digitally printing a pre-treated textile substrate. Typically, this involves the following steps in the order of:
  a) providing a substrate;
  b) applying a pre-treatment composition comprising a salt of a multivalent cation and/or an acid;

c) applying by jetting a clear ink comprising a polymeric binder;
d) applying by jetting a white ink; and
e) applying by jetting non-white colored inks.

Preferably, the pre-treatment solution is applied to the fabric by spraying from about 0.20 to about 7.5 grams of multivalent cationic (calcium) salt per 100 grams of fabric, more preferably from about 0.60 to about 6.0 grams of multivalent cationic (calcium) salt per 100 grams of fabric, and still more preferably from about 0.75 to about 5.0 grams of multivalent cationic (calcium) salt per 100 grams of fabric.

Printing can be accomplished by any inkjet printer equipped for handling and printing fabric. Commercial printers include, for example, M-LINK Direct-to-Garment printer from M&R Companies (Roselle, IL), the Dupont™ Artistri™ 3210 and 2020 printers, and the Mimaki TX series of printers.

As indicated above, a variety of inks and ink sets are available for use with these printers. Commercially available ink sets include, for example, DuPont™ Artistri™ P7000 and P6000 series inks.

The amount of ink laid down on the fabric can vary by printer model, by print mode (resolution) within a given printer and by the percent coverage need to achieve a given color. The combined effect of all these considerations is grams of ink per unit area of fabric for each color.

Typically, step c) takes place after step b) without drying the textile substrate. More typically, the time interval between applying the pre-treatment and applying the clear ink is less than 10 minutes. Most typically, the time interval between applying the pre-treatment and applying the clear ink is less than 1 minute.

Typically, step d) takes place after step c) without drying the textile substrate. More typically, the time interval between applying the clear ink and applying the white ink is less than 10 minutes. Most typically, the time interval between applying the clear ink and applying the white ink is less than 1 minute.

Typically, step e) takes place after step d) without drying the textile substrate. More typically, the time interval between applying the white ink and applying the colored inks is less than 10 minutes. Most typically, the time interval between applying the white ink and applying the colored inks is less than 1 minute.

An alternative embodiment provides that the step above for applying a white ink is eliminated, and the printing method involves the following steps in the order of:
a) providing a substrate;
b) applying a pre-treatment composition comprising a salt of a multivalent cation and/or an acid;
c) applying by jetting a clear ink comprising a polymeric binder; and
d) applying by jetting non-white colored inks.

The printed textiles may optionally be post processed with heat and/or pressure, such as disclosed in US20030160851 (the disclosure of which is incorporated by reference herein for all purposes as if fully set forth). Upper temperature is dictated by the tolerance of the particular textile being printed. Lower temperature is determined by the amount of heat needed to achieve the desired level of durability. Generally, treating temperatures will be at least about 80° C., and preferably at least about 140° C., more preferably at least about 150° C., and most preferably at least about 160° C.

Optionally modest fusion pressures can be applied to achieve improved durability. Pressures can be about 3 psig, preferably at least about 5 psig, more preferable at least about 8 psig and most preferably at least about 10 psig. Fusion pressures of about 30 psi and above appears to provide no additional benefit to durability, but such pressures are not excluded.

The duration of post processing (amount of time the printed textile is under pressure at the desired temperature) is not believed to be particularly critical. Most of the time in the post processing operation generally involves bringing the print up to the desired temperature. Once the print is fully up to temperature, the dwell time can be brief (minutes).

EXAMPLES

The invention is further illustrated by, but not limited to, the following examples, in which parts and percentages are by weight unless otherwise noted.

Ingredients and Abbreviations
DBTDL=Dibutyltindilaurate

DMP=3,5-Dimethylpyrazole
DMPA=dimethylol propionic acid
IPDI=isophoronediisocyanate
TEA=triethylamine.
TETA=triethylenetetramine
Duranol™ T5651 & T5652—polycarbonate diols from Asahi Kasei
Terathane® 1400 & 2900—polyether diols from Invista (Wilmington, DE)
Stepanpol® PH-56—a polyester diol from Stepan Company (Northfield, IL)
Desmophen® C1200—a polycarbonate polyester diol from Covestro (Leverkusen, Germany)
Takelac™ W6110— waterborne polyurethane resin from Mitsui Chemicals (Tokyo, Japan)

Unless otherwise noted, the above chemicals were obtained from Aldrich (Milwaukee, WI) or other similar suppliers of laboratory chemicals.

Preparation of Pre-Treatment Solution

A pre-treatment solution was prepared by making a 5 wt % Calcium Nitrate solution in deionized water.

Preparation of Clear Ink

Clear Ink Polymer Binder 1

To a dry, clean flask, equipped with an addition funnel, a condenser, stirrer and a nitrogen gas line were added 224 g of Duranol™, 140 g of acetone, and 0.2 g of DBTL. The contents were heated to 40° C. and thoroughly mixed. To the mixture was added 103 g of IPDI via the addition funnel at 40° C., with any residual IPDI being rinsed from the addition funnel into the flask with 10 g of acetone.

The flask temperature was raised to 50° C., held for 60 minutes then followed by 14.5 g of DMPA, then followed by 9.7 g of TEA, was added to the flask via the addition funnel, which was then rinsed with 10 g of acetone. The flask temperature was then raised again to 50° C. and held at 50° C. until NCO % was 4% or less. Then, 23.4 g of DMP was added to the flask. The mixture was stirred at 50° C. until NCO % was 1.88% or less.

With the temperature at 50° C., 800 g of deionized (DI) water was added over 10 minutes, followed by 7.1 g of TETA (as a 10% solution in water) over 5 minutes, via the addition funnel, which was then rinsed with 15.0 g of water. The mixture was held at 50° C. for 1 hr, then cooled to room temperature.

Acetone was removed under vacuum, leaving a final dispersion of polyurethane with about 31.0% solids by weight.

Polymer Binders 2-9 were prepared using ingredients listed in Table 1 below using procedures similar to that for the preparation of Polymer Binder 1.

TABLE 1

| Ingredients | Binder 1 | Binder 2 | Binder 3 | Binder 4 | Binder 5 | Binder 6 | Binder 7 | Binder 8 | Binder 9 |
|---|---|---|---|---|---|---|---|---|---|
| Duranol T5651 | 284 | | | | | | | | 50 |
| Duranol T5652 | | 224 | | | | | | | |
| Terathane 1400 | | | 210 | | | | | | |
| Terathane 2900 | | | | 556.8 | | | | | |
| Stepanpol PH56 | | | | | 280 | 300 | | 153 | |
| Desmophen C1200 | | | | | | | 284 | 131 | 184 |
| IPDI | 140 | 103 | 90 | 206 | 76 | 82 | 82 | 103 | 115 |
| DMPA | 18 | 14.5 | 25 | 33.4 | 18 | 17 | 16.5 | 16.5 | 20 |
| TEA | 12 | 9.7 | 16.8 | 22.4 | 10 | 11.4 | 11.1 | 11.1 | 13.4 |
| DMP | 20.4 | 23.4 | 6.6 | 46.8 | | 8.9 | 10 | 11.5 | 13.1 |
| TETA | 6.2 | 7.1 | 2 | 14.2 | 4 | 2.7 | 3 | 8.1 | 9.3 |

Preparation of Clear Ink

Clear inks shown in Table 2 below were prepared using standard procedures in the inkjet art. Ingredient amounts are in weight percent of the final ink. Polymer binders and Imprafix are quoted on a solids basis. As an example of ink preparation, the ink vehicle was prepared and added with stirring to the aqueous polymer binder and Imprafix, and stirred until a good ink mixture was obtained.

TABLE 2

| Ingredients | Clear Ink-1 | Clear Ink-2 |
|---|---|---|
| | (Wt %, based on total weight of ink) | |
| 1,3 Propanediol | 20.00 | |
| 1,2 Propanediol | | 21.00 |
| Ethylene glycol | 15.00 | |
| 1-(2-Hydroxyethyl)pyrrolidine | | 14.00 |
| Polymer Binder 4 | 15.00 | |
| Takelac W6110 | | 15.00 |
| Imprafix 2794 | 0.8 | 4.00 |
| Byk 348 | 0.25 | 0.10 |
| Water | Balance to 100% | |

Preparation of Colored Inks

Cyan Ink

A cyan ink was prepared according to procedure disclosed in U.S. Patent Application Publication No. 2017/0355866, the disclosure of which is incorporated by reference herewith for all purposes as if fully set forth.

Yellow Ink

A yellow ink was prepared in a similar fashion as the Cyan ink with the exception of using yellow pigment PY155.

Magenta Ink

A magenta ink was prepared in a similar fashion as the Cyan ink with the exception of using magenta pigment PR122.

Black Ink

A black ink was prepared in a similar fashion as the Cyan Dispersion with the exception of using carbon black pigment.

Preparation of White Ink

White ink was prepared according to procedure disclosed in WO2017/223441.

Printing and Testing

The fabric used for printing was Sport-Tek® 100% polyester T-shirt. Both black and red shirts were printed. Before printing, the fabrics were sprayed with the pre-treatment solution. Subsequent printing was performed on both wet and dried fabric. When pre-treated fabric was printed without drying, less than 1 minute after spraying, the pre-treated fabric was printed with M-LINK Direct-to-Garment printer from M&R Companies (Roselle, IL). Inks were printed in the order of clear ink, white ink and color ink. There was no drying between the different ink layer and jetting time interval was generally less than 1 minute between different inks. Ink was also printed with the same process on dried fabric where the drying process was performed by moving the sprayed fabric through a tunnel dryer on a conveyor belt for 3 minutes at 165° C. The tunnel dryer was a DragonAir Fire™ 3611 manufactured by Brown Manufacturing, Wyoming, MI After printing, all fabric was subsequently cured by moving through DragonAir Fire™ 3611 tunnel dryer on a conveyor belt for 3.5 minutes at 165° C. Comparative prints were created with the same process except no clear ink was jetted with the white and color inks.

To measure the washfastness of the printed image, the fabric was subject to nine cycles of laundering. Image quality was examined and compared before and after washing. If image quality was intact and no ink peeled from the fabric, washfastness was rated excellent. If 5 to 10% of the image was peeled from the fabric and pin holes was observed, washfastness was rated poor. Results in Table 3 below showed Inventive print A printed with clear ink-1 had much improved washfastness over Comparative Print A.

TABLE 3

| | Inventive Print A | Comparative Print A |
|---|---|---|
| Fabric | Wet pre-treated black Sport-Tek ® 100% polyester | Wet pre-heated black Sport-Tek ® 100% polyester |
| Clear Ink | Clear Ink -1 | None |
| Washfastness | Excellent | Poor |

To measure dye migration of the printed image, color properties of the solid white images were measured using an X-Rite colorimeter. L*, a*, were reported as the output. Lower L* indicates less white. A higher a* indicates more red color from dye migration from the fabric. Results in Table 4 below showed Inventive Prints B and C having whiter image with less red dye stains diffusing from red fabric during printing and drying process comparing to Comparative Prints B and C, respectively.

TABLE 4

| | Inventive Print B | Comparative Print B | Inventive Print C | Comparative Print C |
| --- | --- | --- | --- | --- |
| Fabric | Wet pre-heated red Sport-Tek ® 100% polyester | Wet pre-heated red Sport-Tek ® 100% polyester | Dried pre-heated red Sport-Tek ® 100% polyester | Dried pre-treated red Sport-Tek ® 100% polyester |
| Clear Ink | Clear Ink -2 | None | Clear Ink -2 | None |
| White ink image color L* | 94.86 | 89.76 | 88.22 | 81.05 |
| White ink image color a* | 4.69 | 10.15 | 13.33 | 16.17 |

What is claimed is:

1. An inkjet printing method for printing on a textile substrate comprising steps in the order of:
   a) providing the substrate;
   b) applying a pre-treatment composition comprising a salt of a multivalent cation and/or an acid;
   c) applying by jetting a clear ink comprising a polymeric binder;
   d) applying by jetting a white ink; and
   e) applying by jetting non-white colored inks.

2. The method of claim 1, wherein said multivalent cation is selected from one or more of the group of multivalent cations of elements Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn and Pb.

3. The method of claim 1, wherein said acid is selected from the group consisting of polyacrylic acid, acetic acid, glycolic acid, malonic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these acid, and mixtures thereof.

4. The method of claim 1, wherein said acid is selected from the group consisting of polyacrylic acid, acetic acid, and mixture thereof.

5. The method of claim 1, wherein said polymeric binder is selected from the group consisting of polyurethane, acrylic, styrene acrylics, styrene butadienes, styrene butadiene acrylonitriles, neoprenes, ethylene (meth)acrylic acids, ethylene vinyl acetate emulsions, latexes, and mixtures thereof.

6. The method of claim 5, wherein said polymeric binder is selected from the group consisting of polyurethane, acrylic, styrene acrylics, ethylene vinyl acetate emulsions, and mixtures thereof.

7. The method of claim 1, wherein said clear ink further comprising a latent crosslinker which chemically reacts with said polymer upon heat treatment.

8. The method of claim 1, wherein said pre-treatment composition causes said polymer binder to aggregate or precipitate.

9. The method of claim 1, wherein a time interval between the printing of the white ink and printing of the clear ink is less than 10 minutes.

10. The method of claim 9, wherein the time interval between the printing of the white ink and printing of the clear ink is less than 1 minute.

11. The method of claim 1, wherein a time interval between the printing of the colored inks and printing of the white ink is less than 10 minutes.

12. The method of claim 11, wherein the time interval between the printing of the colored inks and printing of the white ink is less than 1 minute.

13. The method of claim 1, wherein the textile substrate is a non-white colored textile.

14. An inkjet printing fluid set comprising:
   a) a pre-treatment composition comprising a salt of a multivalent cation and/or an acid;
   b) a clear ink comprising a polymeric binder;
   c) a white ink;
   d) non-white colored inks; and
   e) a latent crosslinker which chemically reacts with said polymeric binder upon heat treatment.

15. The fluid set of claim 14, wherein said multivalent cation is selected from one or more of the group of multivalent cations of elements Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn and Pb.

16. The fluid set of claim 14, wherein said acid is selected from the group consisting of polyacrylic acid, acetic acid, glycolic acid, malonic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these acid, and mixtures thereof.

17. The fluid set of claim 14, wherein said polymeric binder is selected from the group consisting of polyurethane, acrylic, styrene acrylics, styrene butadienes, styrene butadiene acrylonitriles, neoprenes, ethylene (meth)acrylic acids, ethylene vinyl acetate emulsions, latexes, and mixtures thereof.

18. The fluid set of claim 14, wherein said pre-treatment composition causes said polymeric binder to aggregate or precipitate.

* * * * *